US012312103B2

(12) United States Patent
Al Ahmad et al.

(10) Patent No.: US 12,312,103 B2
(45) Date of Patent: May 27, 2025

(54) SATELLITE ARRAY SYSTEM FOR DETECTION AND IDENTIFICATION

(71) Applicant: United Arab Emirates University, Al Ain (AE)

(72) Inventors: Mahmoud F. Y. Al Ahmad, Al Ain (AE); Abdul-Halim Jallad, Al Ain (AE)

(73) Assignee: United Arab Emirates University, Al Ain (AE)

( * ) Notice: Subject to any disclaimer, the term of this patent is extended or adjusted under 35 U.S.C. 154(b) by 0 days.

(21) Appl. No.: 17/994,731

(22) Filed: Nov. 28, 2022

(65) Prior Publication Data

US 2024/0174383 A1 May 30, 2024

(51) Int. Cl.
| | |
|---|---|
| *B64G 1/24* | (2006.01) |
| *B64G 1/10* | (2006.01) |
| *B64G 1/40* | (2006.01) |
| *B64G 1/66* | (2006.01) |
| *H01Q 1/28* | (2006.01) |
| *H01Q 21/00* | (2006.01) |

(52) U.S. Cl.
CPC ........... *B64G 1/242* (2013.01); *B64G 1/1085* (2013.01); *B64G 1/244* (2019.05); *B64G 1/40* (2013.01); *B64G 1/66* (2013.01); *H01Q 1/288* (2013.01); *H01Q 21/00* (2013.01)

(58) Field of Classification Search
CPC ........ B64G 1/242; B64G 1/1085; B64G 1/40; B64G 1/66; H01Q 1/288; H01Q 21/00
See application file for complete search history.

(56) References Cited

U.S. PATENT DOCUMENTS

| | | | | |
|---|---|---|---|---|
| 4,163,235 A | * | 7/1979 | Schultz ................ | H04B 7/185 342/353 |
| 6,157,621 A | * | 12/2000 | Brown .................. | H01Q 15/02 370/310 |

(Continued)

FOREIGN PATENT DOCUMENTS

| | | | |
|---|---|---|---|
| AU | 2012228397 A1 | * 10/2013 | ........... G08G 5/0013 |
| CN | 108120973 A | 6/2018 | |

(Continued)

OTHER PUBLICATIONS

Song et al. "Spacecraft formation flying system design and controls for four nanosats mission" (Year: 2021).*

*Primary Examiner* — Assres H Woldemaryam
(74) *Attorney, Agent, or Firm* — Boyle Fredrickson, S.C.

(57) ABSTRACT

The technology disclosed relates to a multi-satellite system including at least three satellites where at least two of the satellites comprises at least one antenna array for obtaining observation data, and methods for controlling and continuously changing the configuration of a multi-satellite formation including at least three satellites in a formation. The system enables controlling the relative distances between the satellites and continuously changing the configuration and directions of antenna arrays of separate satellites in a multi-satellite formation in that at least one of the satellites comprises a propulsion system for continuously changing the movement and direction of the satellite relative the other satellites in the formation to thereby, in turn, also change the relative distances and directions between the antennas of separate satellites in the formation.

10 Claims, 3 Drawing Sheets

(56) References Cited

U.S. PATENT DOCUMENTS

| | | | |
|---|---|---|---|
| 7,502,382 B1 * | 3/2009 | Liu | H04B 7/18584 |
| | | | 455/12.1 |
| 8,334,809 B2 * | 12/2012 | Nichols | H01Q 1/3275 |
| | | | 343/700 MS |
| 10,084,534 B2 * | 9/2018 | Coleman | H04B 7/18521 |
| 10,404,357 B2 | 9/2019 | Auer | |
| 10,476,585 B1 * | 11/2019 | Torres | H04B 7/18513 |
| 10,530,468 B2 * | 1/2020 | Coleman | H04L 67/1078 |
| 10,532,831 B2 | 1/2020 | Giraud | |
| 11,104,456 B2 * | 8/2021 | Schilling | B64G 1/26 |
| 2015/0247928 A1 * | 9/2015 | Waters | G01S 19/35 |
| | | | 342/357.4 |
| 2017/0021947 A1 * | 1/2017 | Pellegrino | H02S 10/40 |
| 2018/0251240 A1 * | 9/2018 | Reitman | B64G 1/1078 |
| 2019/0389602 A1 * | 12/2019 | Schilling | B64G 1/242 |

FOREIGN PATENT DOCUMENTS

| | | | | |
|---|---|---|---|---|
| CN | 110708111 A | | 1/2020 | |
| EP | 3859481 A1 * | | 8/2021 | ............ G05D 1/104 |
| GB | 2540775 A * | | 2/2017 | ............ H01Q 3/005 |
| RU | 2668378 C1 * | | 9/2018 | |
| WO | WO-9309029 A1 * | | 5/1993 | ........... B64G 1/1021 |
| WO | 2007058721 A1 | | 5/2007 | |
| WO | WO-2018037424 A1 * | | 3/2018 | ........... B64G 1/1007 |
| WO | 2021158278 A1 | | 8/2021 | |

* cited by examiner

SATELLITE ARRAY SYSTEM FOR DETECTION AND IDENTIFICATION

FIELD OF THE INVENTION

The technology disclosed relates to a multi-satellite system including at least two satellites in co-orbital formation each comprising at least one antenna array for obtaining observation data in the form of electromagnetic energy emitted from a source in space and/or on earth, and methods for controlling and continuously changing the configuration of a multi-satellite formation including at least three satellites in a formation.

In aspects, the technology disclosed relates to a multi-satellite system including at least three satellites in co-orbital formation where at least two of the satellites each comprises at least one observation antenna capable of and configured for collecting observation data, and methods for controlling the relative distances between the satellites and the configuration and directions of antenna arrays of separate satellites in a multi-satellite formation including at least two satellites each comprising at least one antenna array for collecting observation data.

In particular, the technology disclosed relates to a method and a multi-satellite formation including at least three satellites in co-orbital formation where at least one of the satellites comprises a propulsion system for continuously changing the movement and orientation of the satellite relative the other satellites in the formation to thereby, in turn, also change the relative distances and directions between the antennas of separate satellites in the formation.

BACKGROUND OF THE INVENTION

In state-of-the-art satellite system, a formation of satellites typically refers to a system of satellites having a particular geometry and relative positions between the satellites that require a range of accuracy to be maintained.

Satellites are mostly adopted to form a formation in that the satellites cooperate with each other to jointly and autonomously execute tasks. The tasks completed by the single satellite in the past are distributed amongst the satellites in the formation to form a virtual satellite to complete the tasks of a single large satellite, so that the anti-interference and anti-destruction capabilities of the satellite system are greatly improved.

The concept of "Satellite Array System" (SAS) is an emerging technology that will facilitate and control the increasing connectivity of an integrated satellite system. It will efficiently enable the inter and intra link satellite communication over remote distances.

SAS is a very attractive solution due to its flexibility, signal routing, switching and distribution, which can be achieved within its agile based payload. Agile antenna arrays will enhance the functionality by providing the wireless terminals with more frequency bands and bandwidth, maintaining the compact size along with reducing the interference and possible crosstalk.

Furthermore, SAS is robust systems that can be used, for example, to transmit data and control information across satellite-based network infrastructures. Integrating the SAS with current satellite networks will provide additional opportunities for established and newfound satellite operators, especially in connecting remote satellite clusters with each other. The SAS applications will require the use of high gain antennas, steerable beam, MIMO capabilities, to communicate free space long distances with the set of satellites of interest.

Agile antenna tracking and beam repointing is a must whenever the ground terminal or the satellite or any other flying object in space changes location. Beam-steering capabilities are also highly advantageous to simplify installation of fixed terminals operating on conventional satellite networks. Therefore, the development of SAS emerging components requires collaborations with different partners from multi-disciplines and experts in device engineering and material integration along with system level operations.

The current satellite networks will provide additional opportunities for established and newfound satellite operators, especially in connecting remote satellite clusters with each other. Future SAS applications will require the use of high gain antennas, to communicate over the free space long distances with the set of satellites of interest. However, the currently used satellites are typically configured for multiple purposes. The SAS networks will therefore require the proper coordination within and between different clusters with proper linking. This, in turn, requires a physical communication layer which can be optical and/or RF based.

Hence, there is a need for more agile antenna tracking and beam repointing in the collection of observation data by a satellite cluster when an object changes location.

Furthermore, there is a need for mitigating interference for improved data transmission efficiency in communication within and between satellite clusters while maintaining antenna performance and the compact size of the antennas of the satellites in the clusters.

BRIEF SUMMARY OF THE INVENTION

The object of the technology disclosed is to overcome the limitation of the state-of-the-art satellite systems by providing a reconfigurable satellite-based network infrastructure for dynamically adapting frequency, power transmission and direction of the antennas of the individual satellites in a cluster of satellites in orbit.

One objective of the technology disclosed is to provide a satellite cluster configured to mitigate both intra-satellite and inter-satellite interference while supporting more agile beam steering operations for tracking a moving object.

The technology disclosed addresses the need to reduce both intra-satellite and inter-satellite interference in a cluster of satellite while maintaining antenna performance and the compact size of the antennas of the individual satellites in the cluster.

The technology disclosed addresses the internal interference between the plurality of antennas of a formation including at least three satellites while supporting improved beam steering operations for tracking a moving object whose observation data is currently collected.

In aspects, the technology disclosed relates to a multi-satellite system including at least three satellites in co-orbital formation each comprising at least one antenna, and methods for controlling the configuration of a multi-satellite formation by controlling the operations of the propulsion of at least one of the satellites in the formation.

In aspects, the technology disclosed relates to a multi-satellite system including at least three satellites in co-orbital formation each comprising a side antenna for sharing observation data where at least two of the satellites comprises at least one antenna array for obtaining observation data in the form of electromagnetic energy emitted from a source in space and/or on earth, and methods for controlling and continuously changing the configuration of a multi-satellite formation including at least three satellites in a formation.

In aspects, the technology disclosed further relates to a multi-satellite system and formation including at least three satellites in co-orbital formation where at least two of the satellites each comprises at least one antenna array in the form of an observation antenna configured to collect sky and/or earth observation data and a side antenna for transmitting and/or receiving collected sky and/or earth observation data from at least one of the other satellites in the formation.

In aspects, the technology disclosed relates to a multi-satellite system including at least three satellites in co-orbital formation where at least two of the satellites each comprises at least one observation antenna capable of and configured for collecting observation data, and methods for controlling the relative distances and directions between the satellites and the configuration of a multi-satellite formation including at least two satellites each comprising at least one antenna array for collecting observation data.

In aspects, the technology disclosed relates to a system and method for continuously changing the shape and configuration of a multi-satellite formation including a control system and at least three satellites where each of the satellites comprises a side antenna for at least one of transmitting and receiving obtained observation data and at least two of the satellites comprises at least one observation antenna array capable of and configured to obtain information about electromagnetic energy emitted from a source in sky or on earth.

In aspects, the technology disclosed relates to a method and a multi-satellite formation including at least three satellites in co-orbital formation where at least one of the satellites comprises a propulsion system for continuously changing the movement and direction of the satellite relative the other satellites in the formation to thereby, in turn, also change the relative distances and directions between the antennas of separate satellites in the formation.

In aspects, the technology disclosed relates to a method and a multi-satellite formation including at least three satellites where at least one of the satellites comprises a propulsion system for continuously changing the movement and direction of the satellite to thereby change the relative distances and directions between the satellites in the set and the shape and configuration of the satellites in the formation.

In aspects, the technology disclosed relates to multi-satellite system comprising a control system configured to continuously control a propulsion system of at least one of the satellites in the formation to change the movement and direction of the satellite to thereby, in turn, continuously change the relative distances and directions between the antenna arrays of separate satellites in the formation.

The technology disclosed relates to a satellite system including a set of at least three satellites in a formation, where the at least two antenna arrays of at least two satellites in the set are directed in mutually different directions and at least one of the satellites in the set comprises a propulsion system. The satellite system may then typically comprise a control system configured to dynamically change the configuration and shape of the formation by controlling the propulsion system of the at least one of the satellites in the set.

In embodiments, at least two of the satellites in the set each comprises at least one observation antenna array arranged with antenna elements configured to continuously collecting observation data from at least one of the sky and earth, where each of the at least two satellites further comprises at least one side antenna array arranged with antenna elements configured to at least one of transmit observation data collected by an observation antenna array to at least one adjacent satellite in the formation and receive observation data collected by an observation antenna array from at least one adjacent satellite in the formation.

In embodiments, the control system is configured to receive or obtain at least one of sky and earth observation data collected by at least one of the satellites in the set, and the control system is further configured to control the propulsion system of at least one satellite in order to change the movement of the at least one satellite at least partly based on at least one of sky and earth observation data collected by at least one of the at least three satellites in the set.

In embodiments, the satellite system comprises at least one sensor and the control system is configured to control the propulsion system of at least one satellite in the satellite formation at least partly based on sensor data obtained by the at least one sensor.

In embodiments, the satellite system comprises at least one sensor and the control system is configured to control the propulsion system of at least one satellite in the satellite formation at least partly based on obtained sensor and/or observation data in combination with pre-known knowledge/artificial intelligence.

In embodiments, the propulsion system of the at least one satellite comprises and engine, for example an electrostatic engine using electrostatic actuation, for changing the movement and direction of movement of the at least one satellite to thereby, in turn, also change the configuration and shape of the two antenna arrays of at least two separate satellites in the formation. satellite formation including changing the relative distances between the satellites in the formation and the relative angle directions of the radiation lobes.

In various embodiments, the control system may be at least partly comprised in at least of the satellites system which is also configured to obtain or receive at least one of sky and earth observation data collected the at least three satellites in the set. The observation data collected by one of the satellites in the set may then first have been shared with at least one of the other satellites in the set prior to being obtained or received by the at least one satellite comprising the control system.

In various embodiments, the control system may be at least partly comprised in at least one communication hub satellite of the satellites system which is also configured to obtain or receive at least one of sky and earth observation data collected the at least three satellites in the set. The observation data collected by one of the satellites in the set may then first have been shared with at least one of the other satellites in the set prior to being obtained or received by the at least one communication hub satellite.

In various embodiments, the control system may be at least partly comprised in at least one ground station located on earth which is also configured to obtain or receive at least one of sky and earth observation data collected the at least three satellites in the set. The observation data collected by one of the satellites in the set may then first have been shared with at least one of the other satellites in the set prior to being obtained or received by the at least one ground station.

In embodiments, the set of at least three satellites in the formation are, in its basic configuration, aligned on a substantially straight line in space and the relative distances and directions between the antenna elements of at least two separate satellites in the formation may be continuously changed by controlling a propulsions system of at least one of the satellites in the formation.

In embodiments, each satellite of at least three of the satellites in the formation may incorporate a set of antennas including at least two antenna arrays, preferable four antenna arrays, where each of the antenna arrays may be a fixed antenna or a tunable/reconfigurable antenna, for example a tunable/reconfigurable antenna with beam-steering capabilities. The tunable/reconfigurable antenna may then comprise an electronic component configured to enable beam-steering capabilities and/or to tune the antenna.

In embodiments, the technology disclosed relates to a satellite system including a set of at least three satellites in a formation, wherein at least two antenna arrays of at least two separate satellites in the set are directed in mutually different directions and at least one of the satellites in the set comprises a propulsion system, and wherein the satellite system comprises a control system configured to dynamically change the configuration and shape of the formation by controlling the propulsion system of at least one of the satellites in the set, wherein at least two of the satellites in the set each comprises at least one observation antenna array arranged with antenna elements configured to continuously collecting observation data from at least one of the space and earth, and wherein each of the at least two satellites further comprises at least one side antenna array arranged with antenna elements configured to at least one of transmit observation data collected by an observation antenna array to at least one adjacent satellite in the formation and receive observation data collected by an observation antenna array from at least one adjacent satellite in the formation, and wherein the control system is configured to receive or obtain at least one of space and earth observation data collected by at least one of the satellites in the set and the control system is further configured to control the propulsion system of at least one satellite in order to change the movement of the at least one satellite at least partly based on at least one of sky and earth observation data collected by at least one of the at least three satellites in the set. The control system of the satellite system may then be configured to control the propulsion system of at least one satellite in the set at least partly based on observation data collected by at least one of the at least two antenna arrays of at least two separate satellites in the set.

The technology disclosed further relates to a method for dynamically controlling the configuration and shape of an in-orbital formation of satellites of a satellite system comprising a control system and a set of at least three satellites where at least two antenna arrays of at least two separate satellites in the set are directed in mutually different directions, and wherein the control system is configured to send commands to the propulsion system of at least one of the satellites in the set at least partly based on collected observation data to thereby change the positioning and/or movements of the at least one of the satellites in the set to thereby also change the configuration and shape of the satellite formation. The change to the satellite formation may then include a change to at least one of the relative distances between the satellites in the set and the relative angle directions of the radiation lobes of at least two antenna arrays of at least two separate satellites in the formation.

In aspects, the technology disclosed relates to a method for dynamically controlling the configuration and shape of an in-orbital formation of satellites for a satellite system comprising a control system and a set of at least three satellites where at least two antenna arrays of at least two separate satellites in the set are directed in mutually different directions and each of the at least two separate satellites comprises at least one observation antenna array arranged with antenna elements configured to continuously collect observation data from at least one of the space and earth, and where at least one of the satellites in the set comprises a propulsion system. The method according to the technology disclosed may then comprise the following steps:

collecting, by at least one of the at least two observation antenna array, observation data from at least one of the space and earth;
  obtaining, by the control system, the observation data from at least one of the space and earth; and
  controlling, by the control system, the propulsion system of at least one of the satellites in the set at least partly based on the collected observation data.

In aspects and embodiments, the satellite system further comprises at least one sensor for detecting radiation sensor data in space and the above method is further comprising the following steps or actions:

detecting, by the at least one sensor, radiation sensor data;
  obtaining, by the control system, the detected radiation sensor data; and
  controlling, by the control system, the propulsion system of at least one of the satellites in the set at least partly based on the collected observation data.

In embodiments, the above method is further comprising controlling, by the control system of the satellite system, the propulsion system of at least one satellite in the set at least partly based on observation data in combination with pre-known knowledge/artificial intelligence.

In embodiments, the above method is further comprising controlling, by the control system of the satellite system, the propulsion system of at least one of the satellites in the set at least partly based on the collected observation data to change the movement and direction of movement of the at least one satellite to thereby change the configuration and shape of the satellite formation including at least one of the relative distances between the satellites in the set and the relative angle directions of the radiation lobes of at least two antenna arrays of at least two separate satellites in the formation.

DETAILED DESCRIPTION

The technology disclosed provides high flexibility as the configuration and the direction of the formation of satellites in the system may be changed according to the current need for collecting space and/or earth observation data, and the functions of the system can be flexibly improved or increased or decreased. The cooperative work of the plurality of antennas in a satellite formation may be used for sharing the tasks of signal processing, communication, effective load and the like, to thereby realize the scientific and technical mission which cannot be finished by a single large satellite and open up a plurality of new space application fields.

Compared with a single large satellite, even if a single satellite fails in the satellite formation, the loss is small, and the tracking and beam-steering capabilities of the combination of satellites in the satellite formation can be adapted to the movement patterns of the object whose observation data is currently collected by at least one of the satellites in the formation.

The application of the formation of the satellite generates a large amount of data which needs to be transmitted to the ground quickly. Considering the space characteristic of satellite formation, a plurality of satellites can form a space antenna array for information transmission, and if a MIMO communication system can be established between the satellite and the ground, the transmission capability of the satellite-ground communication system can be greatly improved.

For space applications, electrically steerable phased arrays are preferable over mechanical steerable reflectors. Therefore, the use of tunable phased antenna array along with tunable antenna elements provides adequate gain and beam steering capabilities while keeping to minimum the antenna size and number of radiating elements along with the complexity of the excitation network.

The technology disclosed relates to a multi-satellite system including at least three satellites where at least two of the satellites comprises at least one antenna array of small antenna elements for obtaining observation data, and methods for controlling and continuously changing the configuration of a multi-satellite formation including at least three satellites in a formation. The system enables controlling the relative distances between the satellites and continuously changing the configuration and directions of antenna arrays of separate satellites in a multi-satellite formation in that at least one of the satellites comprises a propulsion system for continuously changing the movement and direction of the satellite relative the other satellites in the formation to thereby, in turn, also change the relative distances and directions between the antennas of separate satellites in the formation.

Figure 1:
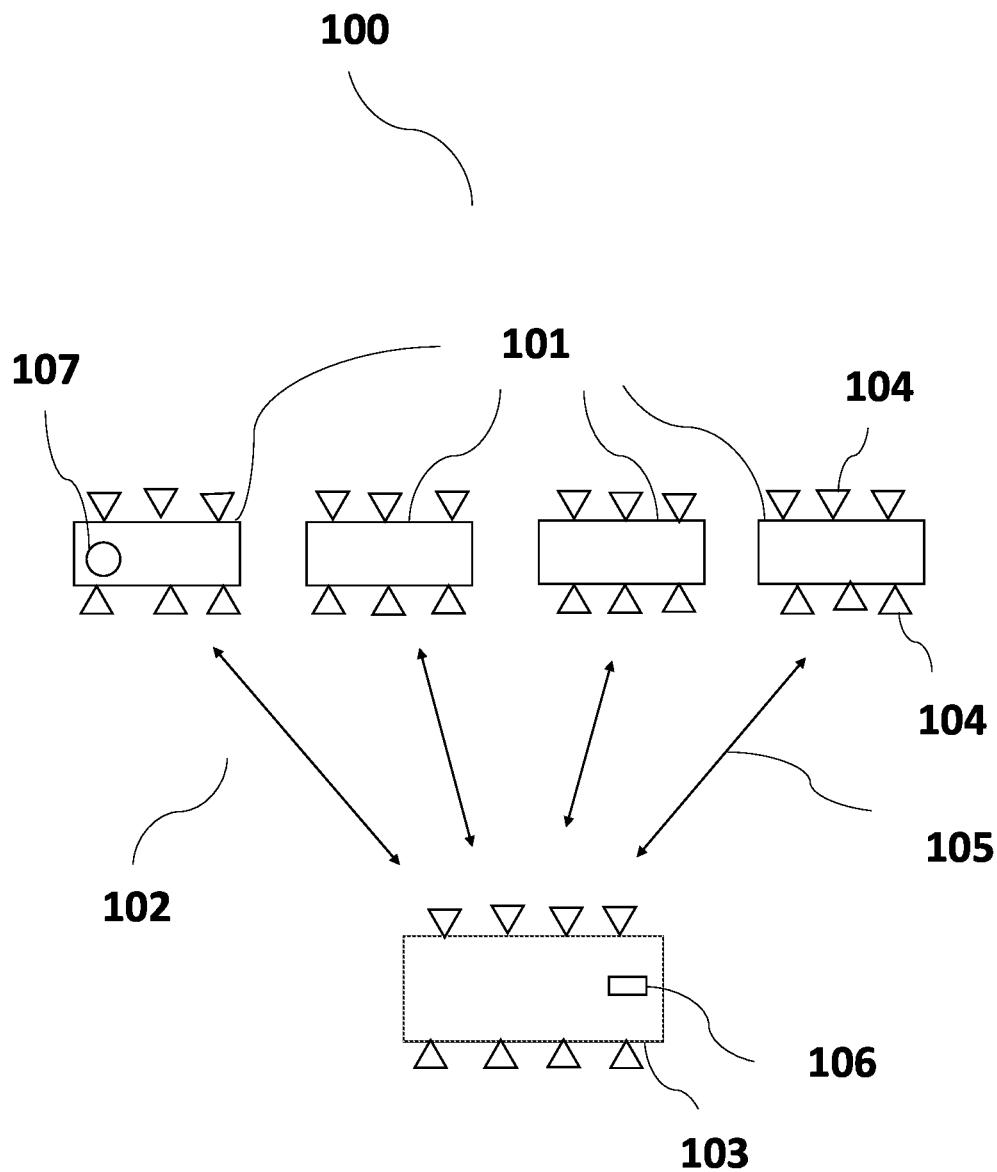
FIG. 1 illustrates an example embodiment of a satellite system according to the technology disclosed including a set of satellites in co-orbital formation and a communication hub satellite where the satellite formation comprises four satellites aligned on a substantially straight line in-orbital formation in space.

FIG. 1 illustrates an example embodiment of the technology disclosed where the satellite system 100 comprises a communication hub satellite 103 and four satellites 101 in a satellite formation 102 where are aligned on a substantially straight line in space. Each of the satellites 101 in the satellite formation illustrated in FIG. 1 comprises two observation antenna arrays 104 for collecting observation data from space and/or earth and have established a wireless communication link 105 with the communication hub satellite 103 for sharing observation data collected by the respective observation antenna array 104 with the communication hub satellite 103. The communication hub satellite 103 in FIG. 1 comprises a control system 106 configured to receive/obtain observation data collected by the observation antenna arrays 104 of the satellite formation 102 and further be configured to transmit control data with commands for controlling the propulsion system 107 of at least one of the satellites 101 in the set at least partly based on the observation data. The communication hub satellite 103 in FIG. 1 has a wireless communication link with a ground station on earth (not shown).

In other embodiments of the technology disclosed, only one or two of the satellites 101 in the satellite formation 102 has a wireless communication link 105 with the communication hub satellite 103. In yet other embodiments of the technology disclosed, the satellite system 100 does not comprise a specific communication hub satellite. Instead, at least one of the at least three satellites 101 in the satellite formation 102 may be configured to forward observation data collected by the observation antenna arrays 104 of the satellite formation 102 to a ground station on earth via an established wireless communication link with the ground station. At least one of the at least three satellites 101, for example the same satellite having an established wireless communication link with the ground station, may then comprise a control system 106 configured to obtain/receive observation collected by the observation antenna arrays 104 of the satellite formation 102 and then transmit control data with commands for controlling the operations of a propulsion system 107 of at least one of the satellites 101 in the formation 102 triggered by and/or based on the obtained/received observation data.

Figure 2:
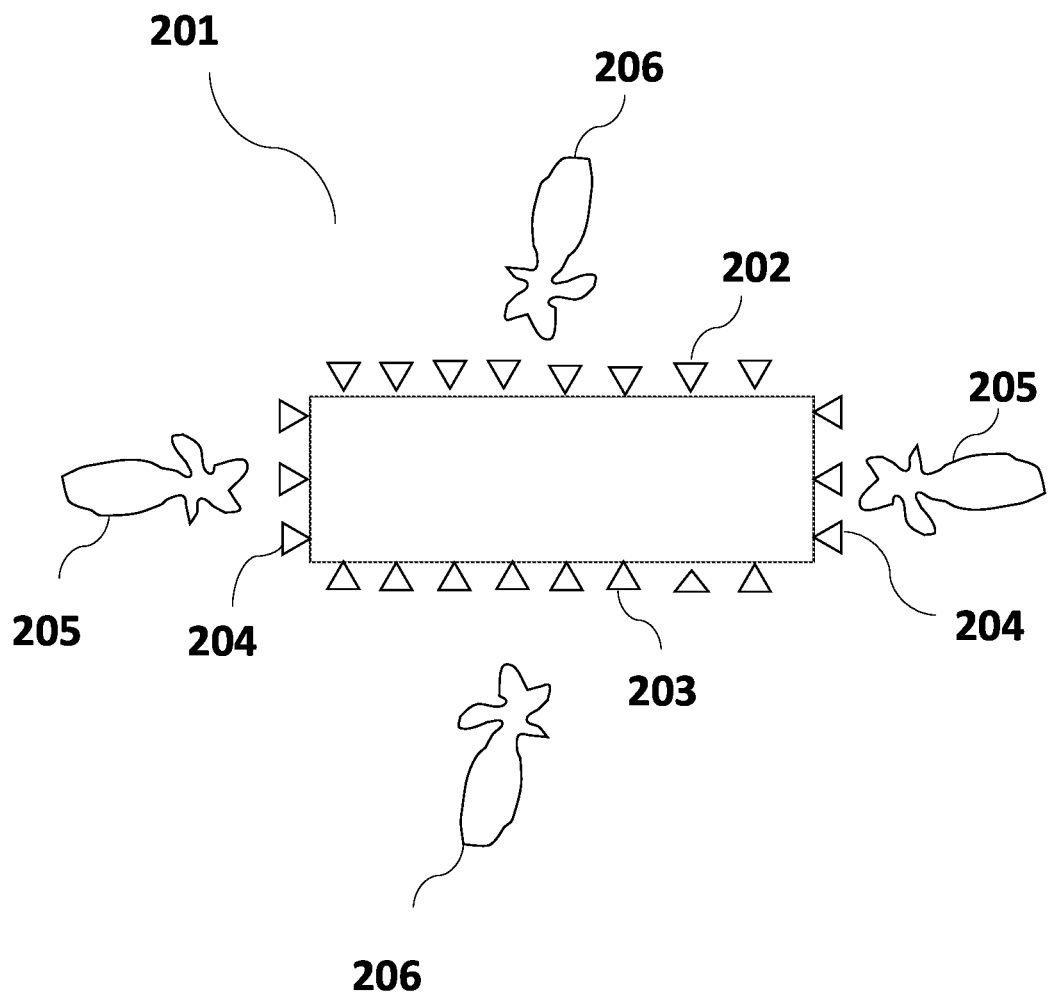
FIG. 2 illustrates an example embodiment of a configuration of an individual satellite of a satellite formation according to technology disclosed.

FIG. 2 illustrates an example embodiment of an individual satellite 201 of a satellite formation according to technology disclosed. The example satellite illustrated in FIG. 2 comprises two observation antenna arrays 202, 203 arranged and configured for collecting observation data from the sky 202 and the earth 203, respectively, and two side antennas 204 for sharing collected observation data with other satellites in the formation, for example by transmitting received and/or its own collected observation data to an adjacent satellite in the set of at least three satellites. The two side antennas 204 of the example satellite illustrated in FIG. 2 are fixed antennas and the two observation antennas 202, 203 are phased array antennas with beam-steering capabilities in that the radiation beam 206 of the respective antenna arrays of the two observation antennas 202, 203 may be directed in various directions relative the positioning of the satellite 201. The radiation beams 205 of the fixed side antennas 204 in the example embodiment of a satellite illustrated in FIG. 2 are each directed in a constant direction relative the positioning of the satellite 201.

In other example embodiments of an individual satellite among the at least three satellites of the co-orbital satellite formation of the satellite system according to the technology disclosed, both the side antenna array and the observation antenna arrays are phased array antennas that have beam-steering capabilities. The radiation beams (main lobe) for each of the at least one observation antenna array and the at least one side antenna array may then be directed in various relative directions in relation to the positioning of the satellite in orbit.

Figure 3:
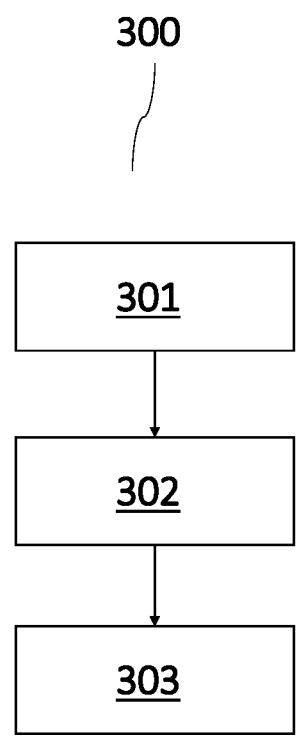
FIG. 3 is a flowchart illustrating a method according to an example embodiment of the technology disclosed.

FIG. 3 is a flowchart illustrating a method 300 according to an example embodiment of the technology disclosed.

In step 301, at least one observation antenna is continuously collecting observation data from at least one of the space and earth.

In step 302, a control system of a satellite system comprising at least three satellites in co-orbital formation at least one of receives and obtains the continuously collected observation data in step 301 from at least one of the satellites in the satellites formation.

In step 303, the control system transmits control data with commands for controlling the propulsion system of at least one of the satellites in the set at least partly based on the observation data received and/or obtained in step 302.

The technology disclosed thus relates to a system including a satellite formation comprising at least three satellites capable of dynamically reconfiguring into different configurations and shapes. Each of the at least three satellites may then comprise, in addition to at least one phased array antenna for collecting space and/or earth observation data, at least one side antenna configured to at least one of continuously transmitting and receiving collected observation data to and from adjacent satellites in the formation. At least one of the satellites in the set of satellites, or formation, may then be configured to be capable of transmitting collected science and/or earth observation data received from other satellites to a ground station located on earth.

The at least one side antenna of each of the at least two satellites in the formation may then be configured to be used for sharing collected science and/or earth observation data with adjacent satellites and may further be configured to occasionally measure the relative distances to adjacent satellites. The measured relative distances may be used by a control system of the satellite system for alignment purposes and for automatically and dynamically controlling and changing the relative distance between individual satellites in the set to thereby automatically and dynamically changing the configuration and shape of the satellite formation.

In embodiments, at least two of the satellites in the set comprises at least two phased array antennas and at least one side antenna, where the main lobes of the three antennas are directed in mutually different directions. The at least two phased array antennas of each of the at least two satellites may then include at least one top and at least one bottom antenna array. The top and bottom antenna arrays may then be each configured to be used for collecting science and/or earth observation data. The top and bottom antenna arrays may then be arranged and configured so that the respective main lobes of the top and bottom antenna arrays are directed at a relative angle within an angle range of 160-200 degrees with respect to each other, typically at 180 degrees with respect to each other.

The main lobe of each of the at least one side antenna array may then be typically directed at a relative angle within an angle range of 60-120 degrees with respect to each of the at least two phased array antennas configured to collect science and/or earth observation data, typically at 90 degrees with respect to each of the at least two phased array antennas. The side antenna array may optionally be a phased antenna array.

In embodiments, artificial intelligence (AI) may be used for smart satellite formation and for dynamically changing the configuration and shape of the satellite formation. The AI software may then be configured to collect and store data related to the previous directions, configuration and/or shape of the satellite formation and this pre-known knowledge may be used by a control system of the satellite system to change the configuration and/or shape of the satellite formation, for example at least partly based on currently collected observation and/or sensor data. As an example, the control system may then be configured to use pre-known knowledge in combination with obtained sensor data and/or collected science and/or earth observation data to change the positioning and/or direction of at least one satellite relative the other satellites in the satellite formation to thereby change the configuration, direction and/or shape of the satellite formation.

In embodiments, the system of the technology disclosed may itself comprise at least one sensor for detecting radiation sensor data in space and this sensor data may be used by the control system of the satellite system for controlling a propulsion system of at least one of the satellites to change the direction and positioning of the satellite relative the other satellites in the satellite formation. For example, the control system may be configured to control the propulsion system for the purpose of changing the relative direction and positioning of the antennas of two separate satellites in the formation. At least one of the satellites in the formation may then comprise the at least one sensor for detecting radiation sensor data in space.

According to aspects of the technology disclosed, at least one of the satellites in the set may comprise a propulsion system for controlling the movement of the individual satellite to thereby change at least one of the relative distances and/or the relative arrangement direction of the antenna arrays of the satellite comprising the propulsion system and at least one of the other satellites in the set. The satellite system may then comprise a control system configured to dynamically control and change the configuration and shape of the satellite formation, including the relative distances and relative angle direction of the satellites in the set, by controlling the propulsion system of at least one of the satellites in the set.

At least one of the satellites in the formation may then comprise a propulsion system and a local control unit comprised in the same satellite as the propulsions system and for controlling the propulsion system. The control system may then be configured to control the propulsion system by transmitting control data to the propulsion systems to change the movement and/or direction of the satellite. The transmission of the satellite-internal control data with the commands to change the operations of the propulsions system may then be triggered by and/or based on observation data collected by at least one of the satellites in the formation and that was obtained by the observation antenna array of the satellite and/or received from at least one of the other satellites in the formation. The transmission of the satellite-internal control data with the commands to change the operations of the propulsions system may then be further triggered by and/or based on sensor data obtained by a sensor unit of the satellite system and/or some pre-known knowledge or data predicted using artificial intelligence, previously obtained by the control unit.

In embodiments, the satellite system includes at least one communication hub satellite comprising the control system configured to control the propulsion system of at least one of the satellites in the set. The at least one communication hub satellite may then be further configured to receive observation data collected by the satellites in the formation and then forward or relay the collected observation data to a ground station located on earth.

In embodiments, the set of at least three satellites in the formation are, in its basic configuration, aligned on a substantially straight line in space as a co-orbital formation and the relative distances and directions between the antenna elements of at least two separate satellites in the formation may be continuously changed by controlling a propulsions system of at least one of the satellites in the formation. The set of satellites may then include at least one communication hub satellite and the satellite formation may comprise at least five satellites which, in their basic satellite formation, are aligned on a substantially straight line in space. At least three of the satellites in the satellite formation may then comprise a phased antenna array for obtaining observation data and have established a communication link with the at least one communication hub satellite.

In embodiments, each satellite of the at least three of the satellites in the formation may incorporate a set of antennas including at least two antenna arrays, preferable four antenna arrays, including at least one observation antenna array and at least one side antenna array where each of the antenna arrays may be a fixed antenna or a tunable/reconfigurable antenna, for example a tunable/reconfigurable antenna with beam-steering capabilities. The tunable/reconfigurable antenna may then comprise an electronic component configured to enable beam-steering capabilities and/or to tune the antenna.

In various embodiments of the technology disclosed, at least the observation antenna array of at least one of the satellites in the set may be a steerable phased array with multiple separate antenna elements forming the array. However, the side antenna configured for sharing collected observation data with the other satellites in the set may also be a steerable phased array. In certain embodiments, the arrangement directions of the antenna elements of the side antennas are, in their basic configuration, at an angle direction relative the arrangement directions of the antenna elements of the observation antennas that is within an angle range of 60 to 120 degrees. The radiating and receiving arrangement of the side antennas of the individual satellites in the set is thereby configured to reduce the risk of significant electromagnetic wave interference with the collection of electromagnetic wave observation data performed by the observation antennas of the same satellite.

The propulsion system used for changing the direction and positioning of a satellite comprising the propulsion system relative to the other satellites in the satellite formation may have no moving parts and may comprise an engine, for example an electrostatic engine using electrostatic actuation by applying a potential difference, for changing the relative positioning and/or direction of the satellite in the satellite formation to thereby, in turn, change the configuration, direction and/or shape of the satellite formation.

In embodiments, at least one of the satellites in the set or formation may then comprise a so-called "ionic wind propelled" propulsion system configured for changing the direction and positioning of the individual satellite relative the other satellites in the satellite formation to thereby change the configuration, direction and/or shape of the satellite formation. Also known as electro-aerodynamic thrust, ionic wind is a wind or thrust that can occur when an electric current is passed between a thin and a thick electrode. If enough voltage is applied, the electrodes can produce sufficient energy to propel the satellite.

The satellite system may include a set of at least three satellites in a formation, wherein at least two of the satellites in the set comprises at least one observation antenna array, for example a phased antenna array, configured to be capable of continuously collecting observation data from at least one of space and earth. Each of the at least two satellites may further comprise at least one side antenna array arranged and configured to transmit observation data collected by an observation antenna array to at least one adjacent satellite in the formation simultaneously with the continuous collection of observation data by the at least one observation antenna array of the same satellite.

The at least two satellites in the set comprises at least one observation antenna array and at least one side antenna array which are arranged and configured so that the arrangement direction, or radiation direction, of the antenna elements of the at least one observation antenna array and the arrangement direction of the antenna elements of the at least one side antenna array are directed in mutually different directions. The individual satellites in the set may thereby be arranged and configured to mitigate potential interference problems and enable for the simultaneous sharing of collected observation data with the continuous collecting of observation data.

In embodiments where at least one of the satellites comprises a side antenna, the antenna elements of the at least one observation antenna array and the antenna elements of the at least one side antenna array are arranged and directed in mutually different directions in that the antenna elements of the at least one observation antenna array are arranged on a first surface whose normal axis over the surface areas of the first surface where the antenna elements are arranged is directed at a substantially different angle relative the normal axis of the surface areas of a second surface of the same satellite onto which the antenna elements of the at least one side antenna array are arranged. As an example, the antenna elements of the at least one observation antenna array may, in its basic configuration, be arranged on the first surface so that the normal axis over the surface areas of the first surface where the antenna elements are arranged is directed at an angle relative the normal axis of the surface areas of a second surface of the same satellite onto which the antenna elements of the at least one side antenna array are arranged is within an angle range of 60-120 degrees.

In embodiments, the arrangement directions of the antenna elements of the at least one observation antenna array are at a constant angle relative the arrangement direction of the antenna elements of the at least one side antenna array, for example a constant angle within the angle range of 60 to 120 degrees.

The set of at least three satellites in the formation may include at least two satellites each comprising at least two observation antenna arrays which are arranged and configured so that the antenna elements of a first observation antenna array and the antenna elements of a second observation antenna array are directed in mutually different directions, thereby being arranged to mitigate interference problems which enables the simultaneous collecting of observation data by the at least two observation antenna arrays. For example, the satellite system may be configured so that one of the observation antennas of a satellite is often directed towards the space for collecting space-based observation data and the other observation may be directed towards the earth for collecting earth-based observation data. The antenna elements of a first observation antenna array may be arranged (i.e. arrangement directions of the antenna elements) so that they are directed at an angle relative the arrangement directions of the antenna elements of the second observation antenna The satellite system of the technology disclosed may comprise a control system and a set of at least three satellites configured to be capable of dynamically reconfiguring the formation into different configurations and shapes, where each of the at least three satellites comprise at least one side antenna configured to at least one of continuously transmitting and continuously receiving collected science and/or earth observation data to/from other satellites while collecting observation data and without causing any significant interference. At least one of the satellites in the set, or a separate at least one communication hub satellite, may then be configured to be capable of transmitting collected science and/or earth observation data received from other satellites to a ground station located on earth.

In embodiments, at least one side antenna array of each of the at least two satellites in the set are configured to be used for sharing collected science and/or earth observation data with adjacent satellites. These side antennas may be further configured to, occasionally, measure the relative distances to adjacent satellites where the measured relative distances are used for alignment purposes and as input data to the control system to dynamically control and change the operations of a propulsion system of a satellite and the relative distance between individual satellites in the set, thereby dynamically changing the shape and/or configuration of the satellite formation.

The at least two satellites in the set may then comprise at least two observation antennas in the form of at least two phased array antennas and at least one side antenna, where the individual satellites in the set is configured so that the direction main lobes of the three antennas of each satellite are arranged and directed in mutually completely different directions, for example at a relative angle direction that is kept more than 30 degrees for each pair of main lobes.

In embodiments, each of the at least two satellites in the set may then include at least one top and at least one bottom antenna array. The top and bottom antenna arrays are each configured to be used for collecting science and/or earth observation data and the main lobes of the top and bottom antenna arrays are directed at a relative angle within an angle range of 160-200 degrees with respect to each other, typically at 180 degrees with respect to each other.

The propulsion of the satellite in the set may be controlled by the control system based artificial intelligence (AI) used for smart formation and changing the configuration and shape of the satellite formation. The AI software may then be configured to collect and store data related to the previous directions, configuration and/or shape of the satellite formation and this pre-known knowledge may be used by a control system of the satellite system to change the configuration and/or shape of the satellite formation in an intelligent and/or optimized way. The control system may then be configured to use this pre-known knowledge in combination with obtained sensor data and/or collected science and/or earth observation data to change the relative positioning and/or direction of at least one satellite in the satellite formation to thereby change the configuration, direction and/or shape of the satellite formation.

In embodiments, the satellite system of the technology disclosed comprises intelligent sensors for detecting radiation sensor data in space and this sensor data may be used by the control system of the satellite system for controlling the propulsion systems of the satellites to change the direction and relative positioning of the satellites in the satellite formation. The propulsion system may then have no moving parts and may comprise an engine, for example an electrostatic engine using electrostatic actuation by applying a potential difference, configured to change the relative positioning and/or direction of at least one satellite in the satellite formation to thereby change the configuration, direction and/or shape of the satellite formation. A solar cell or panel may then be the only source of energy for an electrostatic engine configured to be used for changing the direction and positioning of an individual satellite in the set relative the other satellites in the satellite formation to thereby change the configuration, direction and/or shape of the satellite formation.

An ion-propelled satellite is a satellite that uses electro-hydrodynamics (EHD) to provide lift or thrust without requiring moving parts. Current designs of EHD-based propulsion systems do not produce sufficient thrust for manned flight or useful loads. Ion wind, ionic wind, coronal wind or electric wind typically refers to the flow induced by electrostatic forces linked to corona discharge arising at the tips of some sharp conductors (such as points or blades) subjected to high voltage. The phenomenon of ionic wind typically includes applying a voltage to a pair of electrodes, electrons are stripped off nearby molecules, and the ionized molecules collides with neutral molecules as it moves from one electrode to the other.

In embodiments, the engine of the propulsion system may be driven by solar power generation. The solar cell or panel may then be the only source of energy for an electrostatic engine configured to be used for changing the direction and positioning of an individual satellite relative the other satellites in the satellite formation to thereby change the configuration, direction and/or shape of the satellite formation. In embodiments, at least one of the satellites in the set may comprise flexible solar panels that provide the electrostatic engine with a storage circuit for storing solar power generation.

In embodiments, the satellite system of the technology disclosed includes a set of at least three satellites in a formation, where at least two of the satellites in the set comprises at least one observation antenna array configured to be capable of continuously collecting observation data from at either space or earth. Each of the at least two satellites may further comprise at least one side antenna array arranged and configured to transmit observation data collected by an observation antenna array to at least one adjacent satellite in the formation simultaneously with the continuous collection of observation data by the at least one observation antenna array of the same satellite.

In embodiments, each of the at least two satellites in the set may comprise at least one observation antenna array and at least one side antenna array which are arranged and configured so that the arrangement direction, or radiation direction, of the antenna elements of the at least one observation antenna array and the arrangement direction of the antenna elements of the at least one side antenna array are directed in mutually different directions, thereby being arranged to mitigate interference problems to enable for the simultaneous sharing of collected observation data with the continuous collecting of observation data.

In embodiments, the antenna elements of the at least one observation antenna array and the antenna elements of the at least one side antenna array are arranged and directed in mutually different directions in that the antenna elements of the at least one observation antenna array are arranged on a first surface whose normal axis over the surface areas of the first surface where the antenna elements are arranged is directed at an angle relative the normal axis of the surface areas of a second surface of the same satellite onto which the antenna elements of the at least one side antenna array are arranged. The antenna elements of the at least one observation antenna array may then be arranged on the first surface so that the normal axis over the surface areas of the first surface where the antenna elements are arranged is directed at an angle relative the normal axis of the surface areas of a second surface of the same satellite so that the relative angle is within an angle range of 60-120 degrees.

The antenna elements of the at least one observation antenna array and the antenna elements of the at least one side antenna array may then be configured and arranged on their respective first and second surfaces so that the normal axis over the surface areas of the first surface where the antenna elements of the at least one observation antenna array are arranged is directed at a constant angle relative the normal axis of the surface areas of the second surface of the same satellite onto which the antenna elements of the at least one side antenna array are arranged.

In embodiments, each of the at least two satellites in the set comprises at least two observation antenna arrays which are arranged and configured so that the antenna elements of a first observation antenna array and the antenna elements of a second observation antenna array are directed in mutually different directions, thereby being arranged to mitigate potential interference problems and enable for the simultaneous collecting of observation data by the at least two observation antenna arrays.

In embodiments, the antenna elements of the first observation antenna array and the antenna elements of the second observation antenna array of the same at least one satellite in the set may then be arranged so the radiation beam(s), or main lobe(s), of the antenna elements of the first observation antenna array is/are directed at an angle relative the direction of the radiation beam(s), or main lobe(s), of the antenna elements of the second observation antenna array. The antenna elements of the first observation antenna array may then be arranged so that the radiation beam(s), or main lobe(s), is/are directed at an angle relative the radiation beam(s), or main lobe(s), of the antenna elements of the second observation antenna array that is within an angle range of 160-200 degrees.

In embodiments, the antenna elements of the first observation antenna array and the antenna elements of the second observation antenna array of the same at least one satellite in the set may be arranged and directed in mutually different directions in that the antenna elements of the first observation antenna array are directed at an angle relative the arrangement direction of the antenna elements of the second observation antenna array. The antenna elements of the first observation antenna array may then be arranged so that the normal axis over the surface areas where the antenna elements are arranged is directed at an angle relative the normal axis of the surface areas of the same satellite onto which the antenna elements of the second observation antenna array are arranged is within an angle range of 160-200 degrees.

In accordance with embodiments of the technology disclosed, the set of at least three satellites may, in addition to the at least three satellites in the formation, further comprise at least one communication hub satellite configured to receive observation data, for example information about electromagnetic energy received from a source in space and/or earth, collected by an antenna array of at least one of the at least three satellites in the formation and that was received by the at least one communication hub satellite from at least one of the satellites in the formation.

According to aspects and embodiments, the at least one communication hub satellite may further comprise a control system for controlling a propulsion system of at least one of the satellites in the formation to thereby change the shape and configuration of the satellite formation including the at least three satellites. The at least one satellite may then comprise a propulsion system and a local control unit for controlling the propulsion system and the control system of the at least one communication hub satellite may then be configured to transmit control data via satellite communication to the control unit with commands to change the movement and/or direction of the satellite. The commands in the transmitted control data may be triggered by and/or based on observation data collected by at least one of the satellites in the formation and that was received, by the control system of the at least one communication hub satellite, from at least one of the satellites in the formation. The transmission of the satellite-internal control data with the commands to change the operations of the propulsions system may further be triggered by and/or based on sensor data obtained by a sensor unit of the satellite system and/or some pre-known knowledge or artificial intelligence previously obtained by the control system.

The technology disclosed may further relate to a system comprising a satellite formation comprising at least three satellites that are adaptable to be capable of dynamically reconfiguring the formation into different configurations and shapes. Each of the at least three satellites in the formation may then comprise at least one side antenna configured to at least one of continuously transmitting and continuously receiving collected science and/or earth observation data to/from other satellites.

In embodiments, at least two of the satellites in the set may then comprise a first side antenna with a first inter satellite interface with a first radiating and receiving arrangement of antenna elements as well as a second side antenna with a second inter satellite arrangement with a second radiating and receiving arrangement of antenna elements. The radiating directions of the first and second radiating and receiving arrangement may be dynamically adjusted by a control system so that they are oriented towards the direct successor satellite or predecessor satellite in the set of satellites in the formation.

In embodiments, at least one of the satellites in the set, or satellite formation, is configured to be capable of transmitting collected science and/or earth observation data received from other satellites to a ground station located on earth. At least two of the satellites in the formation may then comprise an antenna, for example a phased array antenna, configured to collect science and/or earth observation data and the observation data collected by a first satellite in the set may be shared with at least one adjacent second satellite among the other satellites in the formation through the transmission of the collected observation data from a side antenna array of the first satellite. The observation data received by a side antenna array of the second adjacent satellite may then be further relayed to at least one third satellite in the set through the transmission by a side antenna array of the second satellite.

In embodiments, the at least one side antenna array of each of the at least two satellites is configured to be used for sharing collected science and/or earth observation data with other adjacent satellites and further configured to, occasionally, measure the relative distances to adjacent satellites where the measured relative distances are used for alignment purposes and to dynamically control and change the relative distance between individual satellites in the set and thereby dynamically changing the configuration and shape of the satellite formation.

In embodiments, at least two of the satellites comprises at least two phased array antennas and at least one side antenna, where the main lobes of the respective of the three antennas of each satellite are directed in mutually different directions. The at least two phased array antennas of each of the at least two satellites may then include at least one top and at least one bottom antenna array. The top and bottom antenna arrays may then be configured to be capable of collecting science and/or earth observation data and the main lobes of the top and bottom antenna arrays are typically directed at a relative angle within an angle range of 160-200 degrees with respect to each other, typically directed at 180 degrees with respect to each other.

In embodiments, at least two of the at least three satellites in the set, or satellite formation, may then comprise at least one side antenna configured for transmitting or receiving collected sky and/or earth observation data. The main lobe of the at least one side antenna array is typically directed at a relative angle within an angle range of 60-120 degrees with respect to each of the at least two phased array antennas configured to collect science and/or earth observation data, typically at 90 degrees with respect to each of the at least two phased array antennas. The side antenna array may optionally also be a phased array antenna.

In embodiments, the technology disclosed relates to a satellite arrangement where each satellite in the arrangement has at least two antenna phased arrays, one for sky observation the other for the earth (or under satellite) observation, and which can be aligned in parabolic or semi sphere or sphere or any other possible shape. Each satellite may then be configured to communicate with its adjacent satellite and/or with the main one that is responsible for collecting data from other satellites and share it with other stations or clusters, ground station, etc. In embodiments, the satellite formation may comprise at least one communication hub satellite configured to collecting data from other satellites and share it with other stations or clusters, ground station, etc. The at least one communication hub satellite may then not comprise a observation antenna array or may comprise an observation antenna array configured for obtaining information about electromagnetic energy emitted from a source on earth.

The technology provides the ability to reconfigure the communications link automatically to adapt frequency, power transmission, direction etc. The technology disclosed further provides the further advantage that the formation will "autonomously" reconfigure, for example automatically reconfigured based on at least one of collected observation data, sensor data collected by an intelligent sensor unit and some pre-known knowledge and/or artificial intelligence.

In embodiments, the formation according to the invention would require a propulsion system, and an accurate navigation system to maintain and reconfiguration. Artificial intelligence (AI) may be then used for smart formation and changing the configuration and shape of the satellite formation. The AI software may then be configured to collect and store data related to the previous directions, configuration and/or shape of the satellite formation and this pre-known knowledge may be used by a control system of the satellite system to change the configuration and/or shape of the satellite formation in an intelligent and/or optimized way. The control system may then be configured to use this pre-known knowledge in combination with obtained sensor data and/or collected science and/or earth observation data in order to change the relative positioning and/or direction of at least one satellite in the satellite formation to thereby change the configuration, direction and/or shape of the satellite formation.

In embodiments, the system comprises intelligent sensors for detecting radiation sensor data in space and this sensor data may be used by the control system of the satellite system for controlling the propulsion systems of the satellites to change the direction and relative positioning of the satellites in the satellite formation.

In embodiments, the propulsion system has no moving parts and comprises an electrostatic engine using electrostatic actuation by applying a potential difference to change the relative positioning and/or direction of at least one satellite in the satellite formation to thereby change the configuration, direction and/or shape of the satellite formation.

For example, the propulsion system of at least one of the satellites may comprise an "ionic wind propelled" propulsion system configured for changing the direction and positioning of an individual satellite relative the other satellites in the satellite formation to thereby change the configuration, direction and/or shape of the satellite formation.

In embodiments, the engine of the propulsion system may be driven by solar power generation. For example, a solar cell or panel may the only source of energy for an electrostatic engine configured to be used for changing the direction and positioning of an individual satellite relative the other satellites in the satellite formation to thereby change the configuration, direction and/or shape of the satellite formation. As an example, the satellites may comprise flexible solar panels that provide the electrostatic engine with a storage circuit for storing solar power generation.

Each satellite, as shown in FIG. 2, may incorporate a set of antennas including at least four antenna phased arrays mutually directed in four different directions in that the main lobe of the at least four phased arrays are directed in at least four mutually different directions. The individual antenna could be designed as a fixed or tunable/reconfigurable antenna and be configured to be operating at the same or different frequencies.

The satellites can be aligned using the side antenna or antenna arrays to form the desirable arrangement. Antennas and antenna arrays of single satellite or multiple, or all can operate at same of different frequency bands. In embodiments, the set of satellites are aligned along a straight line.

In embodiments, each satellite has an auxiliary antenna system for transmitting data. However, in embodiments, some of the satellites can work as transmitting unit and some could work as receiving unit.

Artificial Intelligence (AI) can be accompanied with the system to detection and identification. Each antenna array could be fixed frequency, single band, multi band or tunable. Antennas and antenna arrays of single satellite or multiple, or all can operate at same of different frequency bands. The beam forming could be digital or analogue or hybrid. The alignment of the satellites could be antenna based or optical based or hybrid. The antenna could be RF based or plasmonic based or hybrid. The number of satellites is not limited, and sub arrangement is possible.

The technology disclosed pave the way for efficient data sharing and management in satellite systems by providing the ability to reconfigure the communications link automatically to adapt frequency, power transmission, direction etc.

The technology disclosed provides the further advantage that the formation will "autonomously" reconfigure. In embodiments, the formation according to the technology disclosed would preferably require a propulsion system, and an accurate navigation system, for example to maintaining and reconfiguring the satellite formation comprising the at least three satellites.

The agile satellite configuration and antennas according to the technology disclosed will further enhance the functionality by providing the wireless terminals with more frequency bands and bandwidth, maintaining the compact size and reducing the interference as well as the weight. This will, in turn, also result in significantly improved data transmission efficiency.

The proposed system incorporates agile technology which can be adjusted electronically across the specific spectrum in terms of operational frequency. The technology disclosed will enable the capability for beam steering and pointing towards multiple satellites of interest and will enhance the reception, transmission to overcome spoofing, and multi pathing issues. In addition, the system will enable the MIMO simultaneous reception/transmission with ground stations, spacecraft and the space station. The system will be able to recover the data/information received from other sensory satellites, process them, package them in new format and transmit them further. Therefore, this certainly will enable the connection of the existing and the new founded satellites, which will offer huge scientific advancements across all formats of the space sciences. Additionally, the concept of tunable antennas to optimize for given (changing)

environment opens the door for multiple applications in earth-based networks and systems.

The invention claimed is:

1. A satellite system including:
   a set of satellites in a formation, wherein the formation includes:
   at least three satellites each equipped with a propulsion system and at least one observation antenna for beam-steering operations and arranged in a multi-satellite formation supporting continuous beam steering operations by the combination of satellites for continuously collecting observation data in the form of electromagnetic energy from a moving object whose observation data currently is collected, wherein the observation antenna arra ys of at least two separate satellites in the multi-satellite formation are configured to be directed in mutually different directions, and
   a sensor unit for obtaining radiation sensor data and at least one communication hub satellite provided with a wireless communication link with a ground station and configured to at least one of obtain and receive at least one of sky and earth observation data collected by the at least three satellites in the multi-satellite formation; and
   a control system comprising a software and configured to:
   obtain at least one of space and earth observation data collected by the observation antenna arrays of the satellites in the multi-satellite formation;
   obtain radiation sensor data from the sensor unit and pre-known knowledge from software, wherein the pre-known knowledge includes previous directions and configuration and/or shape of the satellite system; and
   dynamically and continuously change the configuration and shape of said multi-satellite formation for improved tracking and beam steering operations by the combination of satellites by controlling the propulsion system of the satellites in the multi-satellite formation by sending commands to the propulsion systems of the satellites in the multi-satellite formation at least partly based on observation data collected by the observation antenna arrays of the at least three satellites in the multi-satellite formation, radiation sensor data obtained by the sensor unit of the satellite system and some pre-known knowledge in terms of previously acquired observation data obtained from the software to thereby change at least the relative angle directions of the radiation lobes of the observation antenna arrays of at least two separate satellites in the multi-satellite formation for improved tracking and beam steering operations by the combination of satellites.

2. The satellite system according to claim 1, wherein at least two of the satellites in the multi-satellite formation each further comprises at least one side antenna array arranged with antenna elements configured to at least one of transmit observation data collected by an observation antenna array to at least one adjacent satellite in the formation and receive observation data collected by an observation antenna array from at least one adjacent satellite in the formation.

3. The satellite system according to claim 1, wherein each of said at least two satellites further comprises at least one side antenna array arranged and configured to transmit observation data collected by an observation antenna array to at least one adjacent satellite in the formation simultaneously with said continuous collection of observation data by said at least one observation antenna array of the same satellite.

4. The satellite system according to claim 1, wherein each of said at least two satellites in the multi-satellite formation comprises at least one observation antenna array and at least one side antenna array which are arranged and configured so that the arrangement direction, or radiation direction, of the antenna elements of said at least one observation antenna array and the arrangement direction of the antenna elements of said at least one side antenna array are directed in mutually different directions, thereby being arranged to mitigate interference problems to enable for the simultaneous sharing of collected observation data with the continuous collecting of observation data.

5. The satellite system according to claim 1, wherein the antenna elements of said at least one observation antenna array and the antenna elements of said at least one side antenna array are arranged and directed in mutually different directions in that the antenna elements of said at least one observation antenna array are arranged on a first surface whose normal axis over the surface areas of said first surface where the antenna elements are arranged is directed at an angle relative the normal axis of the surface areas of a second surface of the same satellite onto which the antenna elements of said at least one side antenna array are arranged.

6. The satellite system according to claim 1, wherein the antenna elements of said at least one observation antenna array are arranged on said first surface so that the normal axis over the surface areas of said first surface where the antenna elements are arranged is directed at an angle relative the normal axis of the surface areas of a second surface of the same satellite onto which the antenna elements of said at least one side antenna array are arranged is within an angle range of 60-120 degrees.

7. The satellite system according to claim 1, wherein the antenna elements of said at least one observation antenna array and the antenna elements of said at least one side antenna array are configured and arranged on said first and second surfaces, respectively, so that the normal axis over the surface areas of said first surface where the antenna elements of said at least one observation antenna array are arranged is directed at a constant angle relative the normal axis of the surface areas of said second surface of the same satellite onto which the antenna elements of said at least one side antenna array are arranged.

8. The satellite system according to claim 1, wherein each of said at least two satellites in the multi-satellite formation comprises at least two observation antenna arrays which are arranged and configured so that the antenna elements of a first observation antenna array and the antenna elements of a second observation antenna array are directed in mutually different directions, thereby being arranged to mitigate interference problems to enable for the simultaneous collecting of observation data by the at least two observation antenna arrays.

9. The satellite system according to claim 1, wherein the antenna elements of a first observation antenna array and the antenna elements of a second observation antenna array of the same at least one satellite in the multi-satellite formation are arranged and directed in mutually different directions in that the antenna elements of said first observation antenna array are directed at an angle relative the arrangement direction of the antenna elements of said second observation antenna array.

10. A method for dynamically controlling the configuration and shape of a multi-satellite formation of a satellite system according to claim 1, said method is comprising:
forming at least three satellites arranged in a multi-satellite formation supporting continuous beam steering operations by the combination of satellites for continuously collecting observation data in the form of electromagnetic energy from a moving object whose observation data currently is collected, wherein each of the at least three satellites is equipped with a propulsion system and at least one observation antenna for beam-steering operations by the combination of satellites;

collecting, by the observation antennas of the at least three satellites in the multi-satellite formation, observation data from at least one of space and earth in the form of electromagnetic energy from a moving object whose observation data currently is collected;

detecting, by at least one sensor unit of the set of satellites of the satellite system, radiation sensor data;

receiving, by the control system, said observation data from at least one of the satellites in the multi-satellite formation;

obtaining, by the control system, radiation sensor data from said at least one sensor unit and pre-known knowledge from a software of the satellite system, wherein the pre-known knowledge includes previous directions and configuration and/or shape of the satellite system; and controlling, continuously by said control system, the propulsion system of at least one of the satellites in the multi-satellite formation at least partly based on said received observation data,, said obtained radiation sensor data and said obtained pre-known knowledge;

wherein said propulsion system is controlled by said control system continuously sending commands to the propulsion system of at least one of the satellites in the multi-satellite formation to thereby continuously change at least the relative angle directions of the radiation lobes of the observation antenna arrays of at least two separate satellites in the multi-satellite formation for improved tracking an beam steering operations by the combination of satellites.

* * * * *